United States Patent Office 2,908,732
Patented Oct. 13, 1959

2,908,732

PREPARATION OF 1-ALKYNES

John Arthur Tebboth and Martin Keith Johnson, London, England, assignors to The British Oxygen Company Limited, a British company No Drawing. Application May 28, 1956
Serial No. 587,497

Claims priority, application Great Britain June 17, 1955

7 Claims. (Cl. 260—678)

This invention relates to the preparation of 1-alkynes by the dehydrohalogenation of the corresponding halogenated hydrocarbons.

Processes are known for the preparation of 1-alkynes by the dehydrohalogenation of dihalo-alkanes or of monohaloalkenes. Thus, for example, propyne has been prepared from 1:2-dibromopropane using potassium hydroxide or sodium ethoxide solutions in ethanol as dehydrohalogenation agents. The process may be carried out under increased pressure. For example, it has been stated that 1:2-dichloropropane may be reacted with potassium hydroxide in methanol at 175° C. and 5 atmg. to yield 70–80% propyne; but it is probable that the reaction under these conditions is hazardous, owing to the possibility of initiating a violent exothermic decomposition of propyne.

It has also been proposed to prepare alkynes having at least 4 carbon atoms in the molecule by the dehydrohalogenation of the corresponding dihalo-alkanes or monohalo-alkenes by heating them with an alkali metal alkoxide of an alcohol boiling above 100° C., in solution in a water-free alcohol boiling above 100° C., and more particularly by heating with a 2-ethoxyethoxide in 2-ethoxyethanol (ethylene glycol monoethyl ether). It is emphasized, however, that in order to obtain good yields of alkynes, the alkoxide solution employed must be anhydrous. The anhydrous alkali metal alkoxide is obtained either by dissolving the alkali metal itself in the alcohol, or by dissolving the alkali metal hydroxide and removing the water formed by azeotropic distillation, for example with benzene.

In British patent specification No. 709,126 a process has been described for preparing 1-alkynes which comprises continuously feeding a 1:2-dihalo-alkane or a 1- or 2-monohaloalkene in to a boiling solution of an alkali metal alkoxide in an alcohol boiling above 100° C. at a rate such that the temperature of the solution is not substantially lowered during the addition. This has the advantage that dehydrohalogenation can be effected satisfactorily even in the presence of moisture. In carrying out such a reaction starting from an alkali metal hydroxide, water is formed in the course of reaction according to the overall equation:

$$C_nH_{2n}X_2 + 2MOH = C_nH_{2n-2} + aMX + 2H_2O$$

and this water is evolved with the (alkyne-containing) vapors released from the solution. It is unnecessary to remove the water (for example, by azeotropic distillation with a third solvent such as benzene) prior to the reaction with the dihalo-alkane.

The method of specification No. 709,126 allows reasonably high yields of alkynes to be obtained under conditions where the alkali metal hydroxide used exceeds the amount needed to saturate the alcohol used at the temperature of reaction. Under such conditions, however, the reacting mixture becomes progressively more difficult to handle as the reaction proceeds, since a thick slurry of precipitated alkali metal halide in a saturated solution of hydroxide results, and this impedes the dissolution of alkali metal hydroxide to replace that which reacts. The final slurry of undissolved alkali metal hydroxide and virtually insoluble alkali metal halide leads to difficulties in emptying and recharging the reactor and in recovery of solvent.

If, on the other hand, the initial quantity of alkali metal hydroxide is substantially reduced, it has been observed that it is difficult to carry the dehydrohalogenation to completion. In particular, the dehydrochlorination of a dichloro-alkane proceeds very rapidly even at comparatively low concentrations of alkali metal hydroxide, but largely only as far as the monochloroalkene and the dehydrochlorination of the monochloroalkenes proceeds very slowly under such conditions.

It has been observed that under the conditions of the reaction a portion of the high boiling alcohol can be converted into an ether, for example in the case of dichloropropane the presence of an allyl ether of the alcohol has been detected after reaction. The presence of such ethers does not inhibit the reaction but in subsequent use of the recovered solvent containing such ethers, a deficiency of alcohol can arise.

It is an object of the present invention to reduce the amount of alcohol consumed in carrying out the process by reducing the amount of alcohol which cannot economically be made available for re-use owing to its physical attachment to the alkali halide present when the contents of the reaction vessel are filtered. It is a further object of the present invention to reduce the amount of alcohol consumed through side reactions particularly those forming ethers.

According to the present invention, a process for preparing 1-alkynes comprises continuously feeding a 1:2-dihaloalkane or a 1 or 2-monohaloalkene into a stirred heated reaction mixture containing an alkali metal hydroxide or alkoxide of an alcohol boiling above 100° C., an inert liquid diluent and a solution of the alkali metal hydroxide or alkoxide in an alcohol boiling above 100° C., the amount of diluent present being not more than nine times the total weight of the alcohol present and of the alcohol equivalent to the alkoxide present, at a rate such that the temperature of the solution is not substantially lowered during the addition and in an amount such that the alcohol present is at all times at least 50% saturated by weight with the alkali metal hydroxide or alkoxide, and separating the alkyne from the vapors released from the solution.

Particularly suitable alcohols for operating the process of this invention include ethoxyethanol,

butoxyethanol, $CH_3.CH_2CH_2CH_2O.CH_2CH_2OH$, and ethoxyethoxyethanol,  and ethoxyethoxyethoxyethanol,

butoxyethanol, $CH_3.CH_2CH_2CH_2O.CH_2CH_2OH$, and ethticular alcohols.

The temperature of operation may be varied between a lower limit of about 100° C. and an upper limit which will depend on the stability of the particular alcohol used when saturated with alkali metal hydroxide or alkoxide. In general, temperatures in the region of 150–170° are preferred, but the invention is not limited to this temperature range.

The process may be operated with any non-aqueous liquid diluent which is stable under the temperature conditions used and in the presence of the constituents of the reaction mixture (particularly the high concentration of alkali metal hydroxide or alkoxide) but it is preferred to use a hydrocarbon boiling at a temperature above the preferred operating range of 150–170° C. The invention is not, however, limited to the use of such hydrocarbons.

In the preparation of propyne (B.P. −23° C.) or 1-butyne (B.P. 8.5° C.), substantial separation of the alkyne from the residual vapours can be effected by condensation of the latter, using a condenser cooled to normal ambient temperature, but in the case of propyne prepared from 1:2-dichloropropane, refrigeration to a small extent may be desirable, since the most volatile chloropropylene formed (2-chloropropylene) boils at 23° C.

The process of the present invention can be operated with a dihaloalkane which may be fed into a vessel containing the reaction mixture and the condensate, after separation of the alkyne (and if necessary of the aqueous layer as explained below), returned to the same reaction vessel until such time as the residual alkali metal hydroxide or alkoxide is such as would 50% saturate the alcohol present at the temperature of reaction. Thereafter, the dihaloalkane feed can be continued but the condensed vapors other than alkyne and water fed to a second vessel containing in addition to free alkali metal hydroxide or alkoxide and inert liquid, a heated solution of the alkali metal hydroxide or alkoxide in the alcohol boiling above 100° C.

By operating according to the present invention, it is possible to feed dihaloalkane to the solution of the alkali metal hydroxide or alkoxide until a very large proportion of the hydroxide or alkoxide has been converted into the corresponding alkali metal halide. It has been observed that the initial slurry of alkali metal hydroxide or alkoxide, inert liquid, and alcohol solution is readily stirred and also that the slurry of the alkali metal halide in the alcohol and inert liquid at the end of the reaction is particularly readily filtered and that the filter cake is convenient to handle. Moreover, since the amount of alcohol present in comparison with the method of British Patent No. 709,126 has been reduced and replaced by inert liquid, utilization of the alkali metal hydroxide charged is more nearly complete.

It has been observed that by using the process of the present invention, it is possible to achieve continuously satisfactory rates of production of alkyne.

It has further been observed that the amount of alcohol or alkoxide retained on the alkali metal halide which results from filtration of the reaction product, is considerable less than would have been the case if no dilution of the alcohol by inert liquid had been made. Since the preferred alcohols are relatively expensive materials, the process of the present invention enables the loss of solvent which results from physical admixture with the filter cake of metal halide and unreacted metal hydroxide to be considerably reduced.

If the process is operated according to the method of specification No. 709,126, a proportion of the high boiling alcohol is converted into ether. In the case of ethoxyethoxyethanol and dichloropropane this ether is believed to be an allyl ether of ethoxyethoxyethanol. Under these conditions some 15% of the alcohol gets converted into the allyl ether of the alcohol in amount equivalent to a 15% yield on the dichloropropane reacted. It has now been observed that operating according to the method of the present invention when using a diluent the amount of such conversion is reduced roughly in proportion to the amount of diluent used. For example using three parts of diluent to one part of alcohol it was found that less than 5% of the dichloropropane reacted formed the allyl ether of the alcohol.

In a further elaboration of the method of the present invention, the solution of alkali metal alkoxide or hydroxide together with free alkali metal hydroxide and inert liquid diluent which has been reacted with monohaloalkene until the amount of alkali metal hydroxide or alkoxide has been reduced to that which would about 50% saturate the alcohol, can be subsequently reacted with dihaloalkane according to the method of the present invention, the monohaloalkene formed being fed to another solution more concentrated in the alkali metal hydroxide or alkoxide stirred with a similar proportion of inert liquid diluent and free alkali metal hydroxide. By operating in this way, utilization of substantially the whole of the alkali metal hydroxide or alkoxide can be achieved in a sequence of operations.

The invention is illustrated by the following examples:

*Example 1*

A reaction vessel consisting of a closed steel pot provided with stirring means and with suitable connections for the addition of dichloropropane or chloropropylenes, for the addition of solvent and caustic soda, for taking off a slurry of sodium chloride and sodium hydroxide in the solvent, for removing gaseous reaction products and for returning material condensed from the reaction products, was charged with 0.67 kg. of ethoxyethoxyethanol, 2.01 kg. of a commercial gas oil and 0.56 kg. of caustic soda. The vessel was then warmed to 160–170° C. with stirring—an operation which could be performed quite easily. 0.153 kg. of chloropropylenes were then fed to the vessel, followed by 0.678 kg. of dichloropropane. There was produced 0.199 kg. of propyne (64% yield based on dichloropropane); the allene yield was 13%. The material left in the reactions vessel was filtered and its caustic soda content determined. From this it was calculated that the amount of caustic soda used in the reaction was 2.8 g. per g. of propyne. At the same time the ethoxyethoxyethanol together with its allyl ether retained on the filter cake was 40 g., equivalent to 0.20 g. per g. of propyne. In the filtrate the ratio of the ether of ethoxyethoxyethanol to ethoxyethoxyethanol itself was 1:11.

In order to illustrate the fuller utilization of the caustic soda and the reduction in the amount of alcohol retained in the filter cake obtained by the method of the present invention, a second experiment was carried out in the same vessel without the use of diluent. In this case, the vessel was charged with 0.80 kg. of caustic soda and 2.68 kg. of ethoxyethoxyethanol and heated to 160–170° C. At this temperature, 0.168 kg. of chloropropylenes were fed to the reaction vessel, and when this had reacted, 0.66 kg. of dichloropropane was fed, the amount of chloropropylenes formed being allowed to build up in a storage vessel, so as to limit the amount of chloropropylenes recycled to the reaction vessel. At the end of the reaction 168 g. of propyne, 49 g. of allene and 58 g. of chloropropylenes had been produced. After allowing for the chloropropylenes fed and produced, the yield of propyne and allene based on dichloropropane was 74%. The caustic soda reacted corresponded to a usage of 4.13 g. per g. of propyne, whilst 147 g. of the ethoxyethoxyethanol (together with its allyl ether) was retained in the filter cake, equivalent to 0.88 g. per g. of propyne produced. The ratio of the ether of ethoxyethoxyethanol to ethoxyethoxyethanol itself in the filtrate was 1:12.

*Example 2*

The reaction vessel used in Example 1 was charged with 0.67 kg. of ethoxyethoxyethoxyethanol, 2.01 kg. of commercial gas oil and 0.56 kg. of caustic soda, and then heated to 160–170° C. 791 g. of dichloropropane were fed to the vessel at a controlled rate. 154 g. of propyne were produced, corresponding to a yield of 63%, after allowing for the chloropropylenes formed. The caustic soda used was equivalent to 3.9 g. per g. of propyne, while the ethoxyethoxyethoxyethanol content of the filter cake remaining when the residual contents of the reaction vessel were easily filtered was 41 g. or 0.27 g. per g. of propyne.

We claim:

1. Process for preparing a 1-alkyne containing not more than four carbon atoms which comprises heating to a reaction temperature a reaction mixture containing free alkali metal compounds selected from the group consisting of alkali metal hydroxides and alkoxides of alcohols boiling above 100° C., and a solution of the alkali metal compound in an alcohol boiling above 100° C. in admixture with an inert liquid hydrocarbon diluent boiling above 150° C., the amount of said diluent being not more than nine times the total weight of alcohol present and of the alcohol equivalent of the alkoxide present, and continuously adding to the stirred heated reaction mixture a halogenated hydrocarbon, selected from the group consisting of 1:2-dihaloalkanes containing not more than four carbon atoms and 1- and 2-monohaloalkenes containing not more than four carbon atoms, the reaction temperature being maintained between 100° C. and the decomposition temperature of said solution of the alkali metal compound or the boiling point of the diluent whichever is lower, the addition of said halogenated hydrocarbon being at a rate such that the temperature of the reaction mixture is not substantially lowered during the addition and in an amount such that the alcohol is at all times at least 50% saturated by weight with alkali metal compound, and separating the alkyne from the vapors released from the reaction mixture.

2. Process according to claim 1 wherein the alkyne is separated from the vapors released from the reaction mixture by passing the vapors through a condenser maintained at a temperature above the boiling point of the alkyne but below the boiling points of other constituents of the vapors, whereby said other constituents are condensed.

3. Process according to claim 2, wherein the condensate after substantial removal of water contained therein is returned to the reaction mixture.

4. Process according to claim 2 wherein the condensate after substantial removal of water contained therein is fed to a second separate stirred heated reaction mixture containing said alkali metal compound, an inert liquid diluent and a solution of said alkali metal compound in an alcohol boiling above 100° C., the amount of diluent present being not more than nine times the total weight of the alcohol present and of the alcohol equivalent to the alkoxide present, at a rate such that the temperature of the reaction mixture is not substantially lowered during the addition and in an amount such that the alcohol present is at all times at least 50% saturated by weight with the alkali metal compound.

5. Process according to claim 1 wherein the alcohol boiling above 100° C. is selected from the group consisting of ethoxyethanol, butoxyethanol, ethoxyethoxyethanol, and ethoxyethoxyethoxyethanol.

6. Process according to claim 1 wherein the temperature of the reaction mixture is 150–170° C.

7. Process according to claim 4 wherein the temperature of each reaction mixture is 150–170° C.

References Cited in the file of this patent

UNITED STATES PATENTS

| | | |
|---|---|---|
| 2,542,976 | Airs et al. | Feb. 27, 1951 |
| 2,561,516 | Ladd et al. | July 24, 1951 |

FOREIGN PATENTS

| | | |
|---|---|---|
| 709,126 | Great Britain | May 19, 1954 |